US012393657B2

(12) United States Patent
Burström et al.

(10) Patent No.: US 12,393,657 B2
(45) Date of Patent: Aug. 19, 2025

(54) SYSTEMS AND METHODS FOR FASTER BEHAVIORAL RETRAINING

(71) Applicant: BEHAVIOSEC INC., San Francisco, CA (US)

(72) Inventors: Per Burström, Luleå (SE); Matthias Baumhof, Berg (DE); Ingo Deutschmann, Frankleben (DE); Philip Lindblad, Lidingö (SE); Tony Libell, Luleå (SE)

(73) Assignee: LEXISNEXIS RISK SOLUTIONS FL INC., Alpharetta, GA (US)

( * ) Notice: Subject to any disclaimer, the term of this patent is extended or adjusted under 35 U.S.C. 154(b) by 240 days.

(21) Appl. No.: 18/159,731

(22) Filed: Jan. 26, 2023

(65) Prior Publication Data

US 2024/0256643 A1 Aug. 1, 2024

(51) Int. Cl.
*G06F 21/32* (2013.01)
*G06F 21/60* (2013.01)

(52) U.S. Cl.
CPC ............ *G06F 21/32* (2013.01); *G06F 21/604* (2013.01)

(58) Field of Classification Search
CPC .............................. G06F 21/32; G06F 21/604
See application file for complete search history.

(56) References Cited

U.S. PATENT DOCUMENTS

| 9,301,140 | B1* | 3/2016 | Costigan | H04L 67/306 |
| 12,231,889 | B2* | 2/2025 | Dymek | H04W 12/69 |
| 2013/0259330 | A1* | 10/2013 | Russo | G06V 40/1365 |
| | | | | 382/115 |
| 2015/0358317 | A1* | 12/2015 | Deutschmann | H04W 12/065 |
| | | | | 713/186 |
| 2016/0350761 | A1* | 12/2016 | Raziel | G06Q 20/40145 |
| 2022/0124498 | A1* | 4/2022 | Dymek | H04L 63/0876 |
| 2022/0224683 | A1* | 7/2022 | Solano Gomez | H04L 63/0861 |
| 2025/0112925 | A1* | 4/2025 | Norton, Jr. | H04L 63/107 |

OTHER PUBLICATIONS

Lee, Hyoung-joo, and Sungzoon Cho. "Retraining a keystroke dynamics-based authenticator with impostor patterns." Computers & Security 26.4 (2007): 300-310. (Year: 2007).*

* cited by examiner

*Primary Examiner* — Harris C Wang
(74) *Attorney, Agent, or Firm* — TROUTMAN PEPPER LOCKE LLP; James E. Schutz; Mark Lehi Jones

(57) ABSTRACT

Systems and methods are provided for behavioral biometrics retraining on credential input provided by a user for authentication. A method includes receiving a successful login indication that a user has been authenticated for access on the enterprise server based on the credential input. The method includes receiving metadata and user behaviometric data corresponding to the credential input. The method includes computing, with a behavioral scoring module, a metadata similarity score by comparing the received metadata to metadata previously stored in a user profile, resetting at least a portion of previously stored user profile data based on receiving the successful login indication and the metadata similarity score being less than a threshold value, and training user profile data using the received user behaviometric data based on receiving the successful login indication and the metadata similarity score being less than a threshold value.

19 Claims, 6 Drawing Sheets

SYSTEMS AND METHODS FOR FASTER BEHAVIORAL RETRAINING

FIELD OF THE DISCLOSED TECHNOLOGY

The disclosed technology relates generally to behavioral authentication, and more particularly to systems and methods for improving behavioral retraining speeds responsive to changes in static input fields.

BACKGROUND

Most computing devices such as desktop computers, mobile devices, and tablets do not have built-in security mechanisms for user authentication with web services other than the traditional user credentials, Personal Identification Number (PIN), and/or use of additional devices like smart cards or One-Time Password (OTP) tokens. However, web services typically rely on strong user authentication to protect customer data and unauthorized access. Behavioral (or behaviometric) authentication methods can provide an extra layer of authentication security and can improve the user experience when such methods are seamless and/or non-disruptive.

A behavioral biometrics service can provide an enhanced layer of security based on a user's typing, timing, keystroke dwell, etc., for example, when the user enters login/authentication information in static input fields to access a webpage of an enterprise (such as a business, service provider, governmental agency, etc.). When a user changes a password, username, or other login/authentication information, such changes are typically reflected on servers or webpages that are internal to the enterprise but are not necessarily communicated to the behavioral biometrics service associated with the enterprise. Thus, situations can arise where there is no automatic signaling of the changed login/authentication information for the user's behavioral profile.

When such login/authentication information changes occur without the behavioral server having been notified, the behavioral biometrics algorithms may attempt to update an existing user profile (based on old login/authentication information) with the properties of the new login/authentication information, which in most cases will lead to a very bad behavioral score.

An existing but non-ideal solution to this problem is depicted in FIG. 1, in which an API call may be sent by the enterprise server to the behavioral biometrics server when a user's login information change is detected so that the behavioral biometrics algorithms start retraining on the new chosen login information. However, such API call methods can be unreliable due to multiple associated failure risks that can occur, such as incorrect code changes during development, the time required to roll back bad code changes during deployment, infrastructure failures, extreme loads, abuse by bad actors, etc. API calls generally require manual configuration of the login information reset API, which can increase the complexity of the process, can result in misconfigurations and can slow down the overall re-training process. There is a need for improved systems and methods for behavioral retraining.

BRIEF SUMMARY

The disclosed technology may be utilized to improve the efficiency and/or speed associated with behavioral retraining on data entered in static user input fields such as username, password, company login names, etc.

A computer-implemented method is disclosed for behavioral biometrics retraining on credential input provided by a user for authentication. The method includes receiving, at a behavioral biometrics server, and from an enterprise server, a successful login indication that a user has been authenticated for access on the enterprise server based on the credential input. The method also includes receiving, at the behavioral biometrics server, metadata and user behaviometric data corresponding to the credential input. The method includes computing, with a behavioral scoring module, a metadata similarity score by comparing the received metadata to metadata previously stored in a user profile. In certain implementations, the method can include resetting at least a portion of previously stored user profile data based on receiving the successful login indication and the metadata similarity score being less than a threshold value. Certain implementations can include training the user profile data using the received user behaviometric data, for example, based on receiving the successful login indication and the metadata similarity score being less than a threshold value.

A system is disclosed for behavioral biometrics retraining on credential input provided by a user for authentication. The system includes a processor and a memory having programming instructions stored thereon, which, when executed by the processor, cause the processor to receive a successful login indication that a user has been authenticated for access on the enterprise server based on the credential input; receive metadata and user behaviometric data corresponding to the credential input; compute, with a behavioral scoring module, a metadata similarity score by comparing the received metadata to metadata previously stored in a user profile; reset at least a portion of previously stored user profile data based on receiving the successful login indication and the metadata similarity score being less than a threshold value; and train the user profile data using the received user behaviometric data, for example, based on receiving the successful login indication and the metadata similarity score being less than a threshold value.

A non-transitory computer-readable medium is disclosed having stored thereon software instructions that, when executed by a processor, cause the processor to perform a method. The method includes receiving, at a behavioral biometrics server, and from an enterprise server, a successful login indication that a user has been authenticated for access on the enterprise server based on the credential input. The method also includes receiving, at the behavioral biometrics server, metadata and user behaviometric data corresponding to the credential input. The method includes computing, with a behavioral scoring module, a metadata similarity score by comparing the received metadata to metadata previously stored in a user profile. In certain implementations, the method can include resetting at least a portion of previously stored user profile data based on receiving the successful login indication and the metadata similarity score being less than a threshold value. Certain implementations can include training the user profile data using the received user behaviometric data, for example, based on receiving the successful login indication and the metadata similarity score being less than a threshold value.

Certain implementations of the disclosed technology will now be described with the aid of the following drawings and detailed description.

The disclosed technology will now be described using the detailed description in conjunction with the drawings and the attached claims.

DETAILED DESCRIPTION

Certain implementations of the disclosed technology may utilize a combination of a successful login indication and certain metadata, such as hashed login input field data, for example, to provide faster and more robust retraining of a user's behavioral biometrics profile when login information is changed.

Various embodiments and details of the disclosed technology will now be explained with the aid of the attached drawings.

Figure 1:
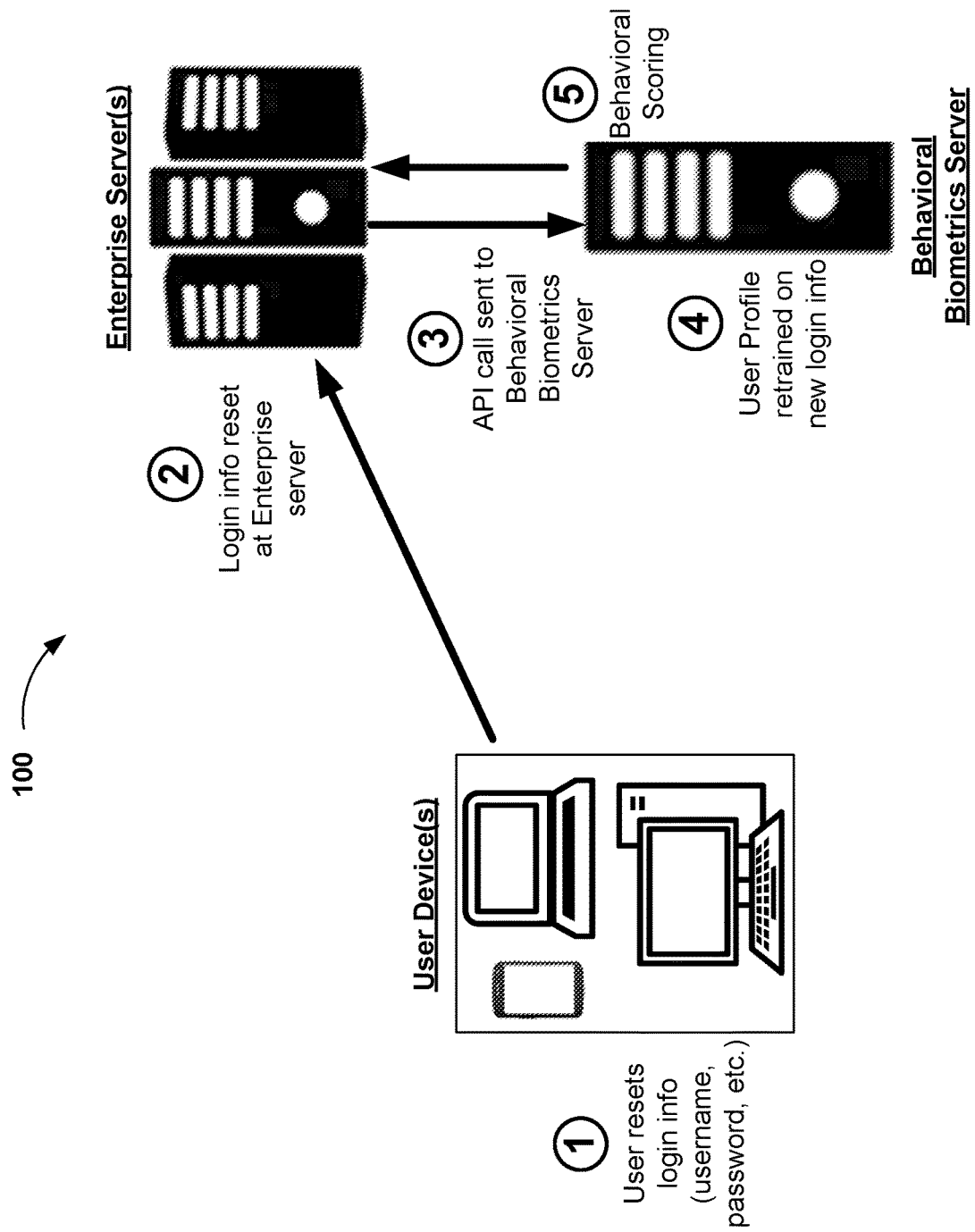
FIG. 1 is a block diagram of a conventional system/process in which an API call is utilized to signal to a behavioral biometrics server that login information has been reset by a user.

FIG. 1 is a block diagram of a conventional system/process 100 in which an API call is utilized to signal to a behavioral biometrics server that login information has been reset by a user. In this system 100, when a user resets login information (Step 1) on their user device, such login information may be reset (Step 2) at the Enterprise Server. In response, the Enterprise Server may send (Step 3) an API call to a Behavioral Biometrics Server to initiate (Step 4) retraining on the new login information. In response, the Behavioral Biometrics Server may then perform behavioral scoring (Step 5) of the subsequent login information. However, as discussed in the background section, API call systems and methods (as depicted in FIG. 1) can be unreliable due to multiple associated failure risks that can occur, such as incorrect code changes during development, the time required to roll back bad code changes during deployment, infrastructure failures, extreme loads, abuse by bad actors, etc. API calls generally require manual configuration of the login information to reset the API, which can increase the complexity of the process, can result in misconfigurations and can slow down the overall re-training process.

Figure 2:
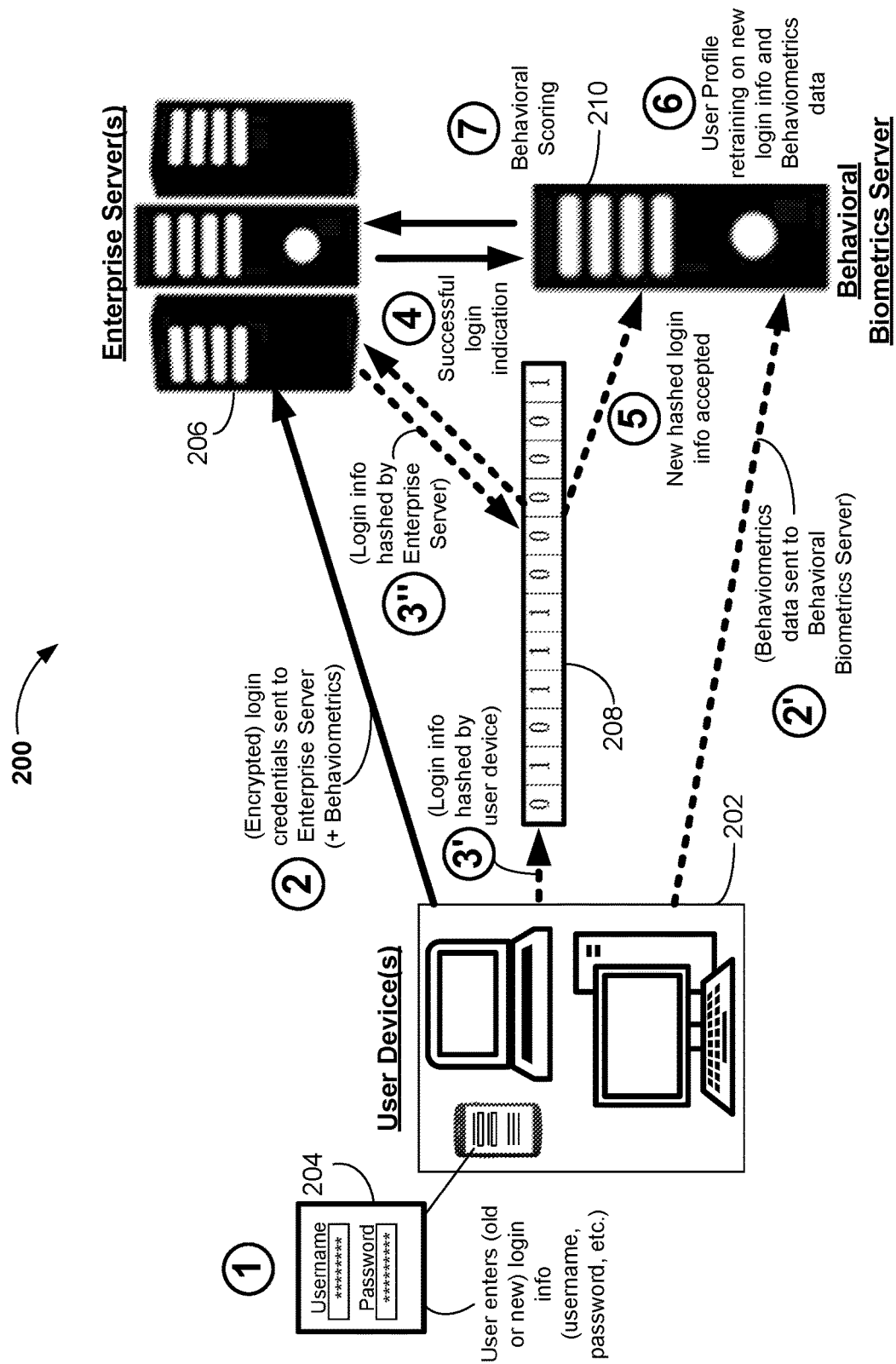
FIG. 2 is an example block diagram of a system/process in accordance with the disclosed technology in which a successful login indication and metadata (such as hashed login info) may be sent to the behavioral biometrics and utilized to reset and retrain a user profile when login information is changed.

FIG. 2 is an example block diagram of a system/process 200 in accordance with the disclosed technology, which may be utilized to address and overcome some or all of the above-mentioned drawbacks of conventional systems and methods. The systems and steps illustrated in FIG. 2 may best be understood in a context in which the user has previously established an online account with an enterprise by providing appropriate credentials, authentications, etc. However, at least a portion of the system/process 200 may also be used for first-time login and access.

As illustrated in FIG. 2, a user may utilize their user device 202 to enter (Step 1) their login information into appropriate input fields 204, such as via static username and password fields. The user device(s) 202 may be in communication with an Enterprise Server 206, and the user's login credentials may be sent (Step 2) from the user device 202 to the Enterprise Server 206, for example, to authenticate and establish an online session with the Enterprise Server 206. In certain exemplary implementations, the user's login credentials entered into the input fields 204 may be encrypted by the user device 202 before such login credentials are sent to the Enterprise Server 206. Upon successful login, the Enterprise Server 206 may provide a successful login indication (Step 4) to the Behavioral Biometrics Server 210, for example, to communicate to the Behavioral Biometrics Server 210 that the user has provided the correct login credentials, which in some example instances, may be the same as previous credentials used. In other instances, the successful login indication (Step 4) can correspond to newly authenticated credentials that may be the result of a first-time login. In other implementations, the successful login indication (Step 4) may stem from resetting previous credentials and establishing/submitting new login credentials, which can happen when a user changes a password, etc.

In certain exemplary implementations, the successful login indication may be used in conjunction with behavioral scoring (Step 7) by the Behavioral Biometrics Server 210 (as will be further explained below) to detect and take appropriate action when new login credentials are used. In certain exemplary implementations, the Behavioral Biometrics Server 210 may store, in a user profile repository, behaviometric data (keyflight, timing, etc.,) corresponding to the login data entered into the input field(s) 204. In certain exemplary implementations, the Behavioral Biometrics Server 210 may train the user profile (Step 6) based on part or all of the login data and/or associated behaviometrics data. Accordingly, each time a user logs in to the Enterprise Server 206, the corresponding behaviometrics data may be sent to the Behavioral Biometrics Server 210, which may score the recently received behaviometrics data against trained behaviometrics data in the user profile. If a low behaviometrics score is computed, then this may indicate that either the account is being accessed by the wrong user or that the real user has recently changed parts of their login information. In certain exemplary implementations, a low behaviometrics score by itself can indicate a fraud attempt, so confirmation of new credentials may be obtained before user profile retraining. However, a low behaviometrics score (below a predetermined threshold) combined with a successful login indication may be used to instruct the Behavioral Biometrics Server 210 to reset the user profile data and start retraining on the new login information and behaviometrics data. Otherwise, if the behaviometrics score is above a predetermined threshold and the Behavioral Biometrics Server 210 is in receipt of the successful login indication, the Behavioral Biometrics Server 210 may continue to train the user profile based on the recently received behaviometrics data.

In accordance with certain exemplary implementations of the disclosed technology, the successful login indication (Step 4) provided by the Enterprise Server 206 to the Behavioral Biometrics Server 210 may also include information that specifies whether the successful login stemmed from recently changed login information (such as after a password change) so that the user may access the Enterprise Server 206 even though the newly changed login information caused a low behavioral score (Step 7). Otherwise, and according to certain implementations, if no indication of recently changed login information is received by the Behavioral Biometrics Server 210 and a low behavioral score is computed, then the Behavioral Biometrics Server 210 may provide an alert to the Enterprise Server 206 that it should take appropriate action, which can include blocking access by the user device 202 and/or requiring re-authenticate by the user with the Enterprise Server 206.

The Enterprise Server 206 shown in FIG. 2 may represent any number of service providers, including but not limited to digital banking services. The service provider's Enterprise Server 206 may communicate with the user device 202 via a custom app that may be downloaded (for example from the Google Play Store or the Apple Store) and installed on the user device 202. Alternatively, the service provider's Enterprise Server 206 may communicate with the user device 202 through a web app and/or JavaScript via a web browser installed on the user device 202. To enable behavioral biometrics security applied to the user interactions performed at the user device 202, collector code may reside in the page or app opened by users accessing the service provided by the Enterprise Server 206. In accordance with certain exemplary implementations of the disclosed technology, the collector code may register behaviometric data pertaining to user interactions, for example, by registering a number of keypresses, timing data from ups and downs of keystrokes, coordinating and timestamp data from mouse or touchscreens, and for mobile devices, the data may further comprise sensor readings from accelerometers, gyroscopes, the pressure or light sensors, etc. In accordance with certain exemplary implementations of the disclosed technology, the behaviometric data may be sent from the user device 202 to the Behavioral Biometrics Server 210 via the Enterprise Server 206 (Step 2) or directly from the user device 202 to the Behavioral Biometrics Server 210 (Step 2').

In accordance with certain exemplary implementations of the disclosed technology, some or all of the available login information entered and/or associated behaviometric data pertaining to user interactions while entering credentials into the input field 202 may be hashed to generate metadata 208, for example, by the user device 202 (Step 3') and the metadata 208 may be communicated with Behavioral Biometrics Server 210 (Step 5). In certain alternative embodiments, some or all of the available login information entered and/or associated behaviometric data pertaining to the user interactions while entering credentials into the input field in the input field 202 may be communicated to the Enterprise Server 206 and may be hashed by the Enterprise Server 206 to generate metadata 208 (Step 3") and such metadata 208 may be communicated with Behavioral Biometrics Server 210 (Step 5).

In accordance with certain exemplary implementations of the disclosed technology, the metadata 208 (such as hashed login info) may be sent to the Behavioral Biometrics Server 210 and utilized for behavioral scoring (Step 7). When login information is changed (for example, a password is changed), the associated new metadata 208 may be used to reset and retrain a user profile for subsequent behavioral scoring.

Certain exemplary implementations of the disclosed technology may be utilized for behavioral scoring, even when the data entered into the input field(s) 204 of the user device 202 are completely anonymized, meaning the input characters are unknown, as is typically the case for passwords. In such implementations, the indices of each typed character may be used to form keypress and key flight values, which may be utilized to generate the metadata 208. In one simple example implementation of the disclosed technology, the metadata 208 may be a hashed value of the length of the data entered into an input field 204 of the user device 202 (e.g., the length of a password), which may allow a direct comparison with previously stored metadata in the user profile since there is no ambiguity in how the hash value/metadata is constructed. For example, if the old and new passwords differ in length, their associated hash values/metadata would not match, resulting in a low behavioral score.

In accordance with certain exemplary implementations, the hashes may be constructed to allow for some fuzziness depending on the type of underlying data used. For example, if keypress/keyflight values are used as the basis for the hash/metadata, the keypress/keyflight values may be transformed in two steps: in step one, the keypress/keyflight values may be rounded to fall within timing bins, such as 20s of milliseconds, for example. In step two, the bin-value pairs may be sorted and ordered into a number [bin0, value0, bin1, value1, . . . ] which may then be hashed. Thus, in this example case, the hashes could represent a statistic of the behavior of the typed password. In accordance with certain exemplary implementations of the disclosed technology, the behavioral scoring could include hash comparisons, and the resulting score may indicate the extent to which these statistics (approximately) match.

In case of a new user, or where a password is changed and the user profile needs to be retrained, the user profile may be reset to a default profile of keypress/keyflight for each index and then it may be trained on successive logins. In certain exemplary implementations, the default profile may be setup so that each index of the characters in a user input field may be assigned a default keyflight time, such as 10 milliseconds. Other default keyflight times may be used for the default profile, including by not limited to random values. In certain exemplary implementations, this keyflight time may represent the time between keypresses. In certain exemplary implementations, and during training, a first character entered in a user input field may initiate measurement of the keypress/keyflight time, and the first index keyflight time may represent the time elapsed between the entry of the first and second characters, the index keyflight time may represent the time elapsed between the entry of the second and third characters and so forth.

Certain additional details of how a behavioral authentication system may operate are discussed in U.S. Pat. No. 10,068,076 entitled "Behavioral authentication system using a behavior server for authentication of multiple users based on their behavior," which is incorporated by reference herein as if presented in full.

Certain implementations of the disclosed technology may utilize classification algorithms including but not limited to decision tree algorithms, naïve Bayes algorithms, rule-based classification, optimal hyperplane algorithms, and genetic algorithms. The analysis tools and techniques utilized herein can include distance distribution analysis, for example, as discussed in Yang, Liu "Distance Metric Learning: A Comprehensive Survey," (2006), the contents of which are incorporated herein by reference as if presented in full.

Certain distance metric learning algorithms may be utilized and/or combined with other analysis techniques (such as K-nearest-neighbor (KNN)). Certain exemplary implementations of the disclosed technology may utilize supervised distance metric learning. Certain exemplary implementations of the disclosed technology may utilize unsupervised distance metric learning. Certain exemplary implementations of the disclosed technology may utilize various forms of global and/or local distance metric learning, such as linear discriminative analysis, adaptive feature relevance analysis, adaptive kernel metric nearest neighbor classification, etc.

Figure 3:
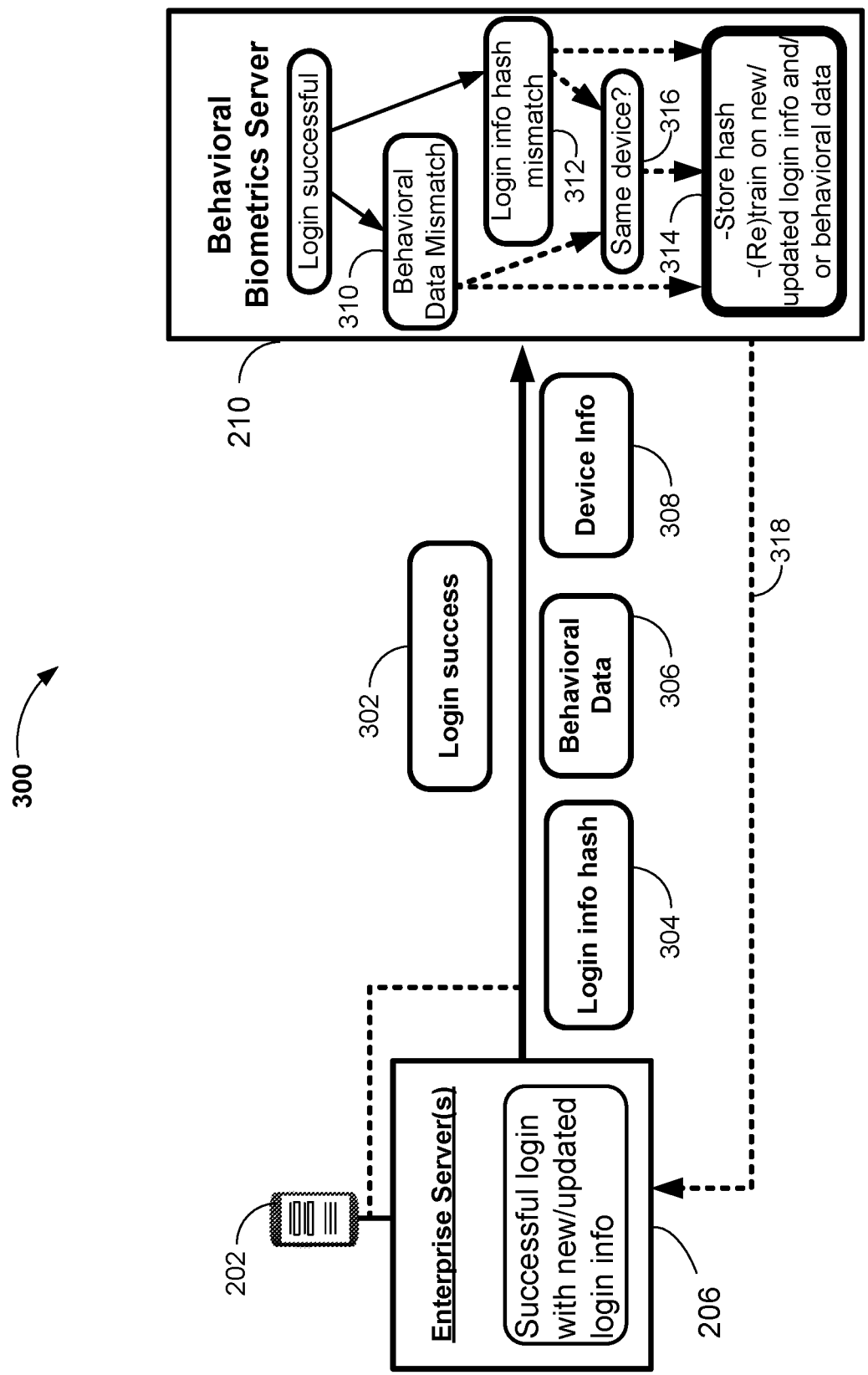
FIG. 3 is an example block diagram of a system/process depicting the data sent from the enterprise server to the behavioral biometrics server which may be utilized for behaviometric retraining, in accordance with certain exemplary implementations of the disclosed technology.

FIG. 3 is an example block diagram of a system/process 300 depicting the data sent from the Enterprise Server 206 (or the user device 202) to the Behavioral Biometrics Server 210 which may be utilized for behaviometric retraining, in accordance with certain exemplary implementations of the disclosed technology. Responsive to a successful login by a user device 202 in which new or updated login information is utilized to login to the Enterprise Server 206, the Enterprise Server 206 (or the user device 202) may send one or more of a login success indication 302, login information hash (metadata) 304, behavioral data 306, and/or user device information 308 to the Behavioral Biometrics Server 210. As discussed above, and in accordance with certain exemplary implementations of the disclosed technology, the Behavioral Biometrics Server 210 may utilize the successful login indication 302 to initiate a check to determine if there is a behavioral data mismatch 310 with previously stored behavioral data in the user profile. In certain exemplary implementations, the successful login indication 302 may also be utilized to initiate a check to determine if there is a login information hash mismatch 312 with previously stored metadata in the user profile, and/or whether it needs to be updated/retrained. In certain exemplary implementations, if there is a behavioral data mismatch 310 and a login information hash mismatch 312, the Behavioral Biometrics Server 210 may store the new login information hash 304 in the user profile 314 and begin (re)training on the new/updated login information hash and/or new behavioral data. In accordance with certain exemplary implementations of the disclosed technology, the device information 308 may be utilized by the Behavioral Biometrics Server 210 to determine if the same user device 316 is being used for the current login as a previously used user device. In certain exemplary implementations, if a new (or unknown) user device is detected, for example, by comparing the received device information 308 with previously stored device information, the Behavioral Biometrics Server 210 may store the new device information in the user profile 314. In certain exemplary implementations, the Biometrics Server 210 may send an alert 318 to the Enterprise Server 206 when a new device is detected.

Certain exemplary implementations of the disclosed technology may include methods to handle situations where a bot or bad/unauthorized actor has logged into to a user account on the Enterprise Server 206 using previous user credentials, which may result in a "successful login" indication 302 but a behavioral data mismatch 310 (e.g., a similarity score that is less than a predetermined threshold). In accordance with certain exemplary implementations of the disclosed technology, to address such a situation, and to prevent the user profile from being trained using the keyflight/behaviometric info from the bot or bad/unauthorized actor, an alert 318 may be generated by the Biometrics Server 210 and sent to the Enterprise Server 206 responsive to a successful login indication 302 received and per computation of a behaviometric similarity score that is less than a predetermined threshold, for example, to request an indication from the Enterprise Server 206 confirming changed user credentials. In accordance with certain exemplary implementations of the disclosed technology, if the user credentials were not recently changed, another alert 318 may be sent to the Enterprise Server 206 to prompt a user re-authentication process by the Enterprise Server 206.

Figure 4:
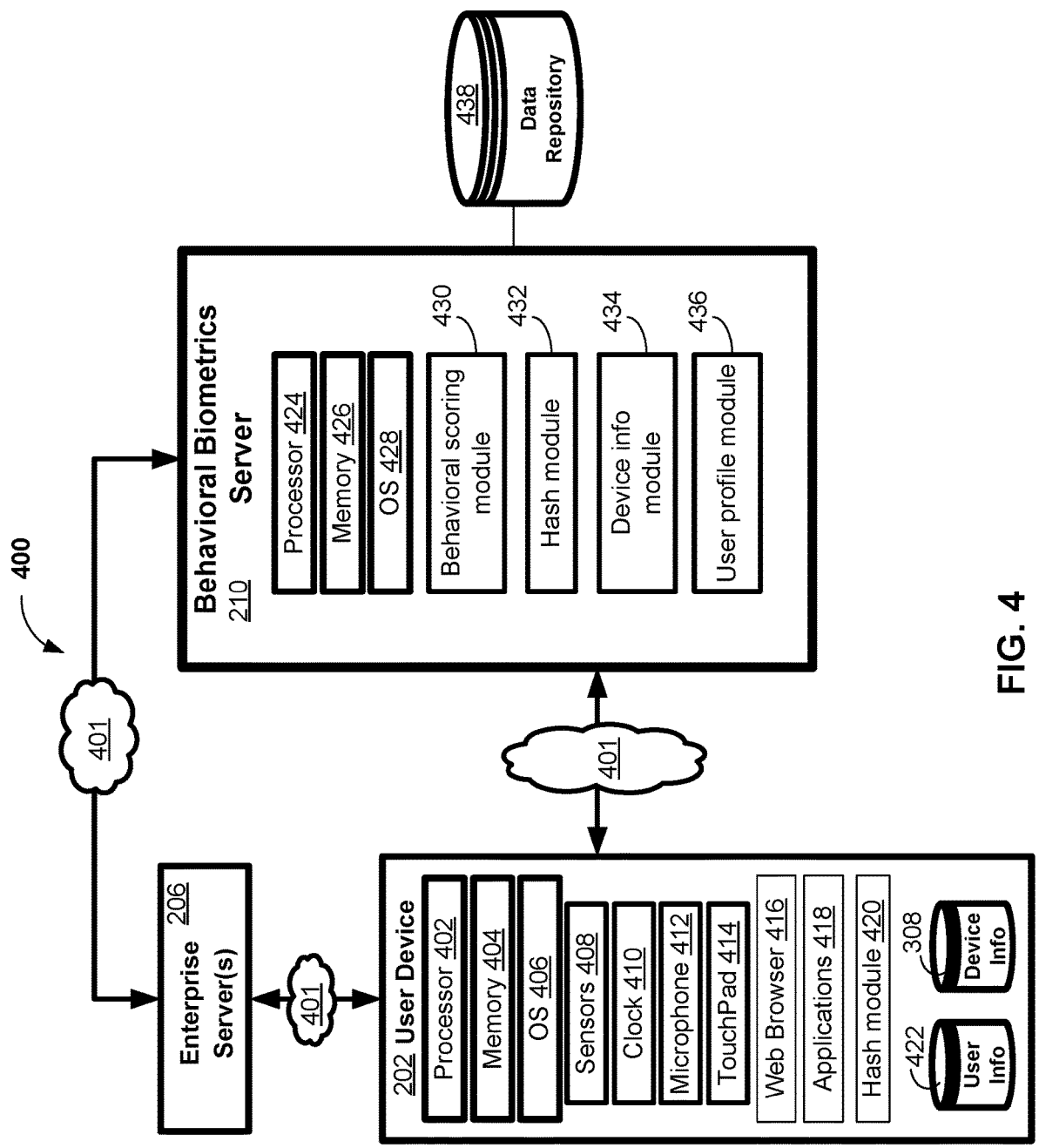
FIG. 4 is an example block diagram of a system, in accordance with certain exemplary implementations of the disclosed technology.

FIG. 4 is an illustration of an example system 400 that may be utilized to carry out certain embodiments of the disclosed technology. In certain exemplary implementations, the user device 202, Enterprise Server 206, and Behavioral Biometrics Server 210 may communicate with each other via the Internet 401 and/or other network channels.

In accordance with certain exemplary implementations of the disclosed technology, the user device 202 may include a processor 402, memory 404, and an operating system 406. In certain embodiments, the user device 202 may include certain hardware- and/or software-based devices, such as sensors 408 (including but not limited to accelerometers), a clock 410, microphone 412, touchpad 414, etc. In certain exemplary implementations, the user device 202 may include a web browser 416, applications, 418, and a hashing module 420, each of which may be implemented the processor 402 in conjunction with the operating system 406 via instructions stored in memory 404. The user device 202 may also include storage for device information 308 and user information 422.

In accordance with certain exemplary implementations of the disclosed technology, the Behavioral Biometrics Server 210 can include a processor 424, memory 426, and an operating system 428. In certain exemplary implementations, the processor 424 may control certain functions and operations of the Behavioral Biometrics Server 210 by executing program instructions stored in the memory 426. For example, the memory 426 may store instructions for collecting a set of behavioral data from the user device 202 and/or Enterprise Server 206 during an online transaction. In accordance with certain exemplary implementations of the disclosed technology, the Behavioral Biometrics Server 210 may include one or more of a behavioral scoring module 430, a hash module 432, a device information module 434, and a user profile module 436. In certain exemplary implementations, user profile information may be stored in a data repository 438. Each of the devices in the example system 400 may also include one or a plurality of input/output network interfaces for communicating with the other devices via a network 401 (e.g., the internet).

One skilled in the art will recognize that an implementation of the actual devices shown in FIG. 4 may contain other components as well, and FIG. 4 is a high-level representation of some of the components of such a device for illustrative purposes.

Figure 5:
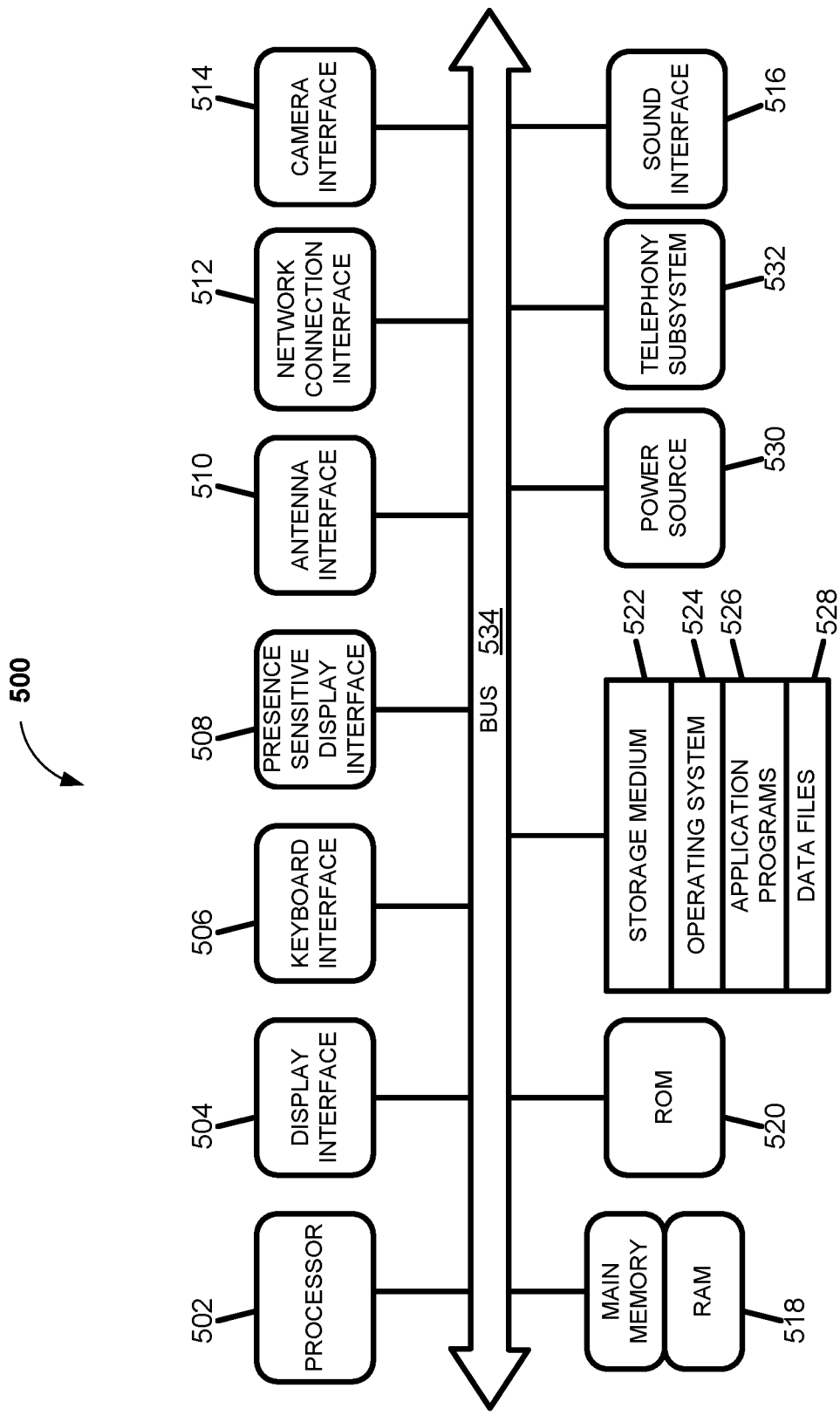
FIG. 5 depicts a block diagram of an illustrative computing device that may be utilized to enable certain aspects of the disclosed technology.

FIG. 5 depicts a block diagram of an illustrative computing device 500 that may be utilized to enable certain aspects of the disclosed technology. Various implementations and methods herein may be embodied in non-transitory computer-readable media for execution by a processor. It will be understood that the computing device 500 is provided for example purposes only and does not limit the scope of the various implementations of the communication systems and methods.

The computing device 500 of FIG. 5 includes one or more processors where computer instructions are processed. The computing device 500 may comprise the processor 502, or it may be combined with one or more additional components shown in FIG. 5. In some instances, a computing device may be a processor, controller, or central processing unit (CPU). In yet other instances, a computing device may be a set of hardware components.

The computing device 500 may include a display interface 504 that acts as a communication interface and provides functions for rendering video, graphics, images, and texts on the display. In certain example implementations of the disclosed technology, the display interface 504 may be directly connected to a local display. In another example implementation, the display interface 504 may be configured for providing data, images, and other information for an external/remote display. In certain example implementations, the display interface 504 may wirelessly communicate, for example, via a Wi-Fi channel or other available network connection interface 512 to the external/remote display.

In an example implementation, the network connection interface 512 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 504 may be operatively coupled to a local display. In another example, the display interface 504 may wirelessly communicate, for example, via the network connection interface 512 such as a Wi-Fi transceiver to the external/remote display.

The computing device 500 may include a keyboard interface 506 that provides a communication interface to a keyboard. According to certain example implementations of the disclosed technology, the presence-sensitive display interface 508 may provide a communication interface to various devices such as a pointing device, a touch screen, etc.

The computing device 500 may be configured to use an input device via one or more of the input/output interfaces (for example, the keyboard interface 506, the display interface 504, the presence-sensitive display interface 508, the network connection interface 512, camera interface 514, sound interface 516, etc.,) to allow a user to capture information into the computing device 500. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 500 or may be a separate device. For example, the input device may be an accelerometer, a magnetometer, a digital camera, a microphone, and an optical sensor.

Example implementations of the computing device 500 may include an antenna interface 510 that provides a communication interface to an antenna; a network connection interface 512 that provides a communication interface to a network. According to certain example implementations, the antenna interface 510 may utilize to communicate with a Bluetooth transceiver.

In certain implementations, a camera interface 514 may be provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, random-access memory (RAM) 518 is provided, where computer instructions and data may be stored in a volatile memory device for processing by the CPU 502.

According to an example implementation, the computing device 500 includes a read-only memory (ROM) 520 where invariant low-level system code or data for basic system functions such as basic input and output (110), startup, or reception of keystrokes from a keyboard are stored in a non-volatile memory device. According to an example implementation, the computing device 500 includes a storage medium 522 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example implementation, the computing device 500 includes a power source 530 that provides an appropriate alternating current (AC) or direct current (DC) to power components. According to an example implementation, the computing device 500 includes a telephony subsystem 532 that allows the device 500 to transmit and receive sound over a telephone network. The constituent devices and the CPU 502 communicate with each other over a bus 534.

In accordance with an example implementation, the CPU 502 has an appropriate structure to be a computer processor. In one arrangement, the computer CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 to execute software programs. Data may be stored in the RAM 518, where the data may be accessed by the computer CPU 502 during execution. In one example configuration, the device 500 includes at least 128 MB of RAM, and 256 MB of flash memory.

The storage medium 522 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 500 to access computer-executable process steps, application programs, and the like, stored on removable and non-removable memory media, to off-load data from the device 500 or to upload data onto the device 500. A computer program product, such as one utilizing a communication system may be tangibly embodied in storage medium 522, which may comprise a machine-readable storage medium.

According to one example implementation, the term computing device, as used herein, may be a CPU, or conceptualized as a CPU (for example, the CPU 502 of FIG. 5). In this example implementation, the computing device (CPU) may be coupled, connected, and/or in communication with one or more peripheral devices.

It should also be understood by one skilled in the art that the devices depicted in FIGS. 2 through 4 may be implemented on a computing device 500 such as is shown in FIG. 5.

Figure 6:
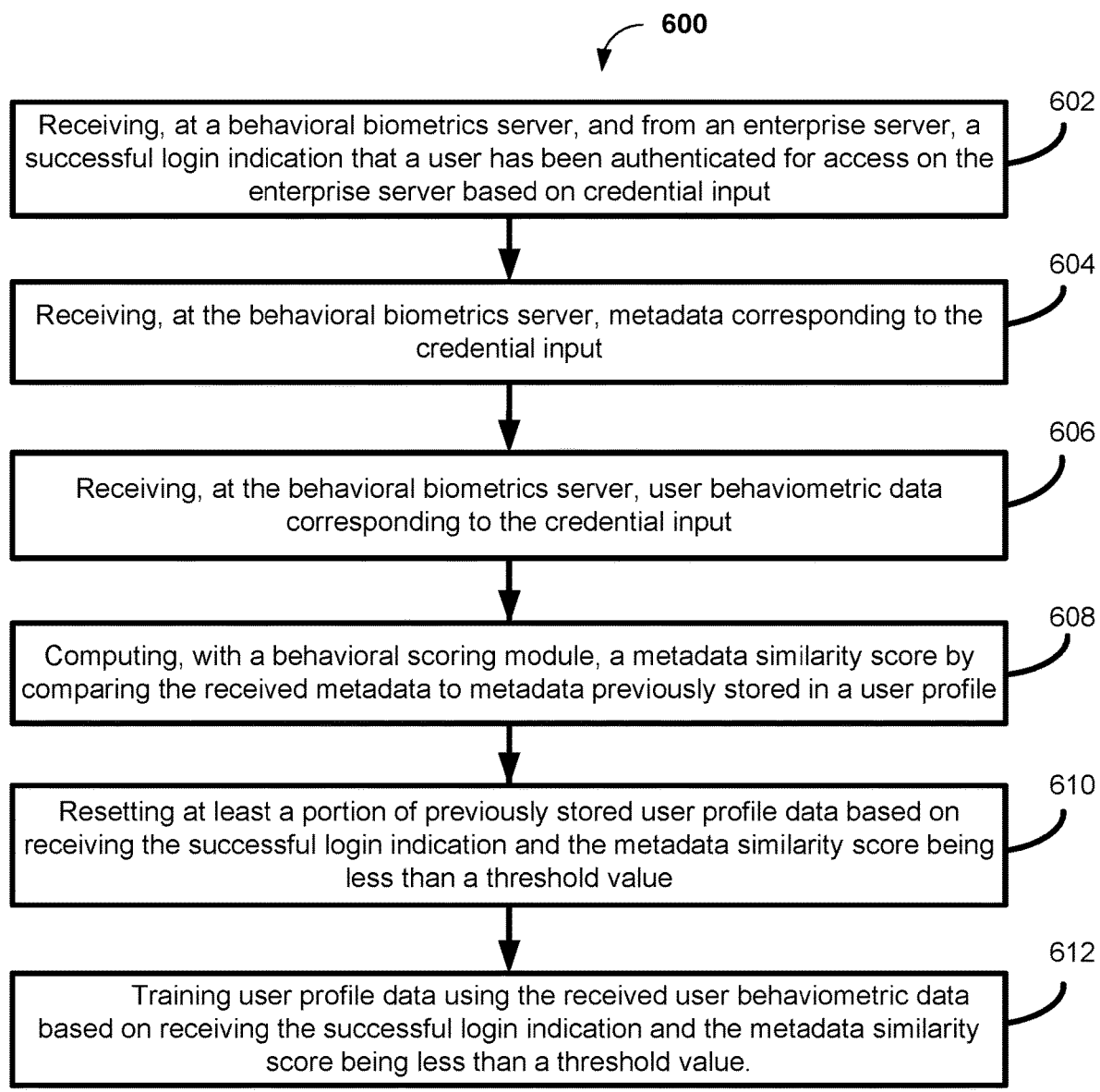
FIG. 6 is a flow diagram of a method, in accordance with certain implementations of the disclosed technology.

FIG. 6 is a flow diagram of a method 600 for behavioral biometrics retraining on credential input provided by a user for authentication, in accordance with certain implementations of the disclosed technology. In block 602, the method 600 includes receiving, at a behavioral biometrics server, and from an enterprise server, a successful login indication that a user has been authenticated for access on the enterprise server based on the credential input. In block 604, the method 600 includes receiving, at the behavioral biometrics server, metadata corresponding to the credential input. In block 606, the method 600 includes receiving, at the behavioral biometrics server, user behaviometric data corresponding to the credential input. In block 608, the method 600 includes computing, with a behavioral scoring module, a metadata similarity score by comparing the received metadata to metadata previously stored in a user profile. In block 610, the method 600 includes resetting at least a portion of the previously stored user profile data based on receiving the successful login indication and the metadata similarity score being less than a threshold value. In block 612, the method 600 includes training user profile data using the received user behaviometric data based on receiving the successful login indication and the metadata similarity score being less than a threshold value.

In certain exemplary implementations, the metadata can include a generated hash based on the credential input. In certain exemplary implementations, the credential input can include at least one field having field content comprising one or more of a username, a password, and a company login name.

According to an exemplary implementation of the disclosed technology, the generated hash may be based on a length of the field content corresponding to the credential input.

In certain exemplary implementations, the generated hash may be based on all or part of the field content corresponding to the credential input.

In certain exemplary implementations, the generated hash may be based on behaviometric data corresponding to the credential input.

Certain implementations can include computing, with the behavioral scoring module, a behaviometric similarity score by comparing the received user behaviometric data to behaviometric data previously stored in the user profile.

Certain exemplary implementations of the disclosed technology can include generating and sending a request to the enterprise server to re-authenticate a user when user credentials have not changed and responsive to receiving the successful login indication and the behaviometric similarity score is less than a threshold value.

In accordance with certain exemplary implementations of the disclosed technology, the behaviometric data can include one or more of keypress count, keypress timings, timings between keypresses, bigram timings, number of pauses during keypress entry, and length of pauses during keypress entry.

Certain exemplary implementations of the disclosed technology can include receiving, at the behavioral biometrics server, user device information. In certain exemplary implementations, resetting at least a portion of the previously stored user profile data may be based on the user device corresponding to a trusted device.

In accordance with certain exemplary implementations of the disclosed technology, training the user profile data may be allowed when a digital signature is utilized by the trusted device to sign the metadata or hash.

In accordance with certain exemplary implementations of the disclosed technology, the successful login indication can include at least a portion of one or more of the credential input and behavioral data related to the credential input.

It is a particular feature of the disclosed technology that the use of the systems described herein with reference to FIGS. 2-4 and the method of FIG. 6 can improve the function of a computerized authentication system, by ensuring that the authenticated party is indeed the one carrying out the transaction and that their device is not being managed remotely by a fraudulent party. This improves the authentication of users and ensures that transactions are more secure.

Implementations of the subject matter and the functional operations described herein may be implemented in various systems, digital electronic circuitry, or in computer software, firmware, or hardware, including the structures disclosed herein and their structural equivalents, or in combinations of one or more of them. Implementations of the subject matter described herein can be implemented as one or more computer program products, i.e., one or more modules of computer program instructions encoded on a tangible and non-transitory computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flow described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media, and memory devices, including by way of example semiconductor memory devices, e.g., EPROM, EEPROM, flash memory devices. The processor and the memory can be supplemented by, or incorporated into, special-purpose logic circuitry.

While this disclosure includes many specifics, these should not be construed as limitations on the scope of any invention or of what may be claimed, but rather as descriptions of features that may be specific to particular embodiments of particular inventions. Certain features that are described in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described herein should not be understood as requiring such separation in all embodiments.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the disclosed technology.

We claim:

1. A computer-implemented method for behavioral biometrics retraining on credential input provided by a user for authentication, the method comprising:
   receiving, at a behavioral biometrics server, and from an enterprise server based on the credential input:
      a successful login indication that a user has been authenticated for access on the enterprise server;
      metadata corresponding to the credential input; and
      user behaviometric data corresponding to the credential input;
   computing, with a behavioral scoring module, a metadata similarity score by comparing the received metadata to metadata previously stored in a user profile;
   computing a behaviometric similarity score by comparing the received user behaviometric data to behaviometric data previously stored in the user profile;
   generating and sending a request to the enterprise server to re-authenticate a user when user credentials have not changed and responsive to receiving the successful login indication and the behaviometric similarity score is less than a threshold value;
   resetting at least a portion of previously stored user profile data based on receiving the successful login indication and the metadata similarity score or the behaviometric similarity score being less than a threshold value; and
   training user profile data using the received behaviometric data based on receiving the successful login indication and the metadata similarity score being less than a threshold value.

2. The method of claim 1, wherein the metadata comprises a generated hash based on the credential input, wherein the credential input includes at least one field having field content comprising one or more of a username, a password, and a company login name.

3. The method of claim 2, wherein the generated hash is based on one or more of a length of the field content corresponding to the credential input and all or part-of the field content corresponding to the credential input.

4. The method of claim 2, wherein the generated hash is based on behaviometric data corresponding to the credential input.

5. The method of claim 4, wherein the behaviometric data comprises one or more of keypress count, keypress timings, timings between keypresses, bigram timings, number of pauses during keypress entry, and length of pauses during keypress entry.

6. The method of claim 2, further comprising receiving, at the behavioral biometrics server, user device information, and wherein resetting at least a portion of the previously stored user profile data is further based on the user device corresponding to a trusted device.

7. The method of claim 6, wherein training the user profile data is allowed only when a digital signature is utilized by the trusted device to sign the metadata or hash.

8. The method of claim 1, wherein the successful login indication comprises at least a portion of one or more of the credential input and user behaviometric data related to the credential input.

9. A system configured for behavioral biometrics retraining on credential input provided by a user for authentication, the system comprising:
   a processor; and
   a memory having programming instructions stored thereon, which, when executed by the processor, cause the processor to:
      receive, from an enterprise server:
         a successful login indication that a user has been authenticated for access on the enterprise server based on credential input;
         metadata corresponding to the credential input; and
         user behaviometric data corresponding to the credential input;
      compute a metadata similarity score by comparing the received metadata to metadata previously stored in a user profile;

compute a behaviometric similarity score by comparing the received user behaviometric data to behaviometric data previously stored in the user profile;

generate and send a request to the enterprise server to re-authenticate a user when user credentials have not changed and responsive to receiving the successful login indication and the behaviometric similarity score is less than a threshold value;

reset at least a portion of previously stored user profile data based on receiving the successful login indication and the metadata similarity score or the behaviometric similarity score being less than a threshold value; and train user profile data using the received user behaviometric data based on receiving the successful login indication and the metadata similarity score being less than a threshold value.

10. The system of claim 9, wherein the metadata comprises a generated hash based on the credential input, wherein the credential input includes at least one field having field content comprising one or more of a username, a password, and a company login name.

11. The system of claim 10, wherein the generated hash is based on a length of the field content corresponding to the credential input.

12. The system of claim 10, wherein the generated hash is based on all or part of the field content corresponding to the credential input.

13. The system of claim 10, wherein the generated hash is based on the user behaviometric data corresponding to the credential input.

14. The system of claim 13, wherein the user behaviometric data comprises one or more of keypress count, keypress timings, timings between keypresses, bigram timings, number of pauses during keypress entry, and length of pauses during keypress entry.

15. The system of claim 10, further comprising receiving user device information, and wherein resetting at least a portion of the previously stored user profile data is further based on the user device corresponding to a trusted device.

16. The system of claim 15, wherein training the user profile data is allowed only when a digital signature is utilized by the trusted device to sign the metadata or hash.

17. A non-transitory computer-readable medium having stored thereon software instructions that, when executed by a processor, cause the processor to perform a method of:

receiving, at a behavioral biometrics server, and from an enterprise server based on the credential input:
a successful login indication that a user has been authenticated for access on the enterprise server;
metadata corresponding to the credential input; and
user behaviometric data corresponding to the credential input;

computing, with a behavioral scoring module, a metadata similarity score by comparing the received metadata to metadata previously stored in a user profile;

computing a behaviometric similarity score by comparing the received user behaviometric data to behaviometric data previously stored in the user profile;

generating and sending a request to the enterprise server to re-authenticate a user when user credentials have not changed and responsive to receiving the successful login indication and the behaviometric similarity score is less than a threshold value;

resetting at least a portion of previously stored user profile data based on receiving the successful login indication and the metadata similarity score or the behaviometric similarity score being less than a threshold value; and training user profile data using the received behaviometric data based on receiving the successful login indication and the metadata similarity score being less than a threshold value.

18. The non-transitory computer-readable medium of claim 17, wherein the metadata comprises a generated hash based on the credential input, wherein the credential input includes at least one field having field content comprising one or more of a username, a password, and a company login name.

19. The non-transitory computer-readable medium of claim 18, wherein the generated hash is based on one or more of:
a length of the field content corresponding to the credential input;
all or part of the field content corresponding to the credential input; and
the user behaviometric data corresponding to the credential input, wherein the user behaviometric data comprises one or more of keypress count, keypress timings, timings between keypresses, bigram timings, number of pauses during keypress entry, and length of pauses during keypress entry.

\* \* \* \* \*